Figure 1:
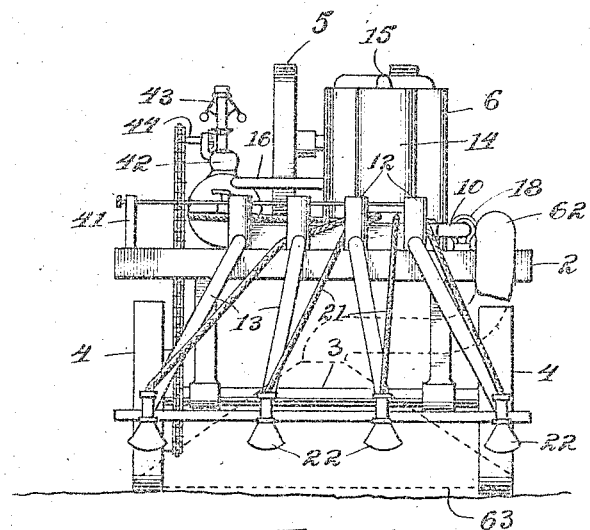

N. V. HENDRICKS.
OIL DISTRIBUTING APPARATUS.
APPLICATION FILED NOV. 17, 1914.

1,210,069.

Patented Dec. 26, 1916.
4 SHEETS—SHEET 1.

Witnesses

Inventor
N. V. Hendricks,
By Victor J. Evans
Attorney

N. V. HENDRICKS.
OIL DISTRIBUTING APPARATUS.
APPLICATION FILED NOV. 17, 1914.
1,210,069.
Patented Dec. 26, 1916.
4 SHEETS—SHEET 2.
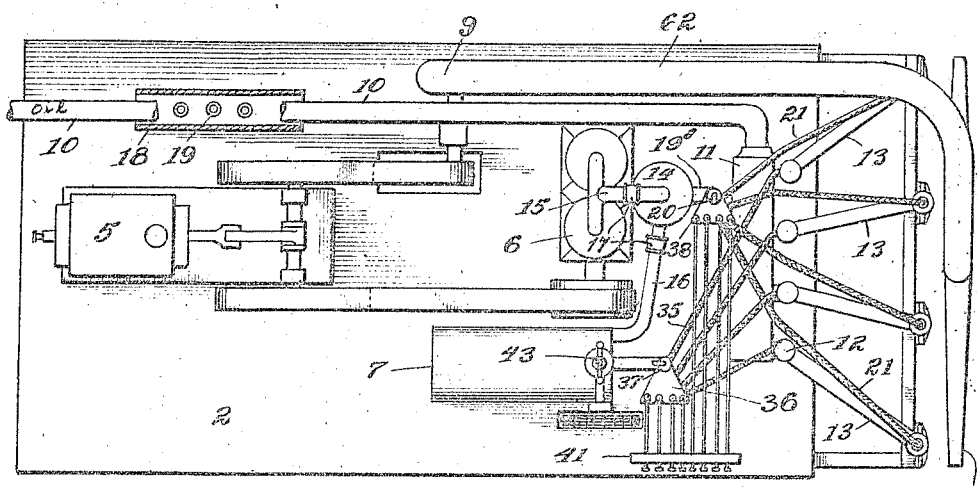
Fig. 3
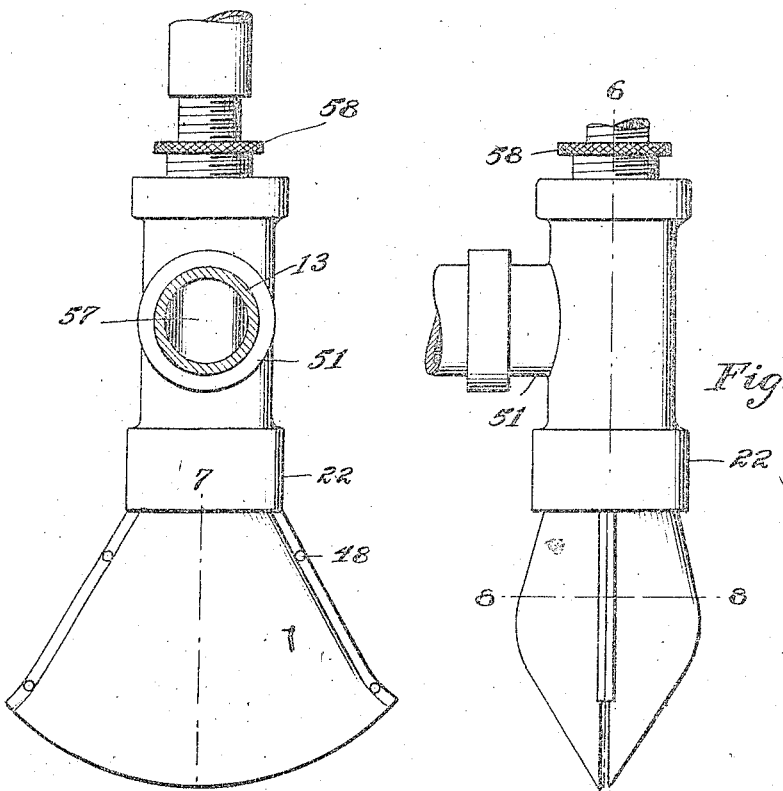
Fig. 4
Fig. 5
Witnesses
Inventor
N. V. Hendricks,
By Victor J. Evans
Attorney

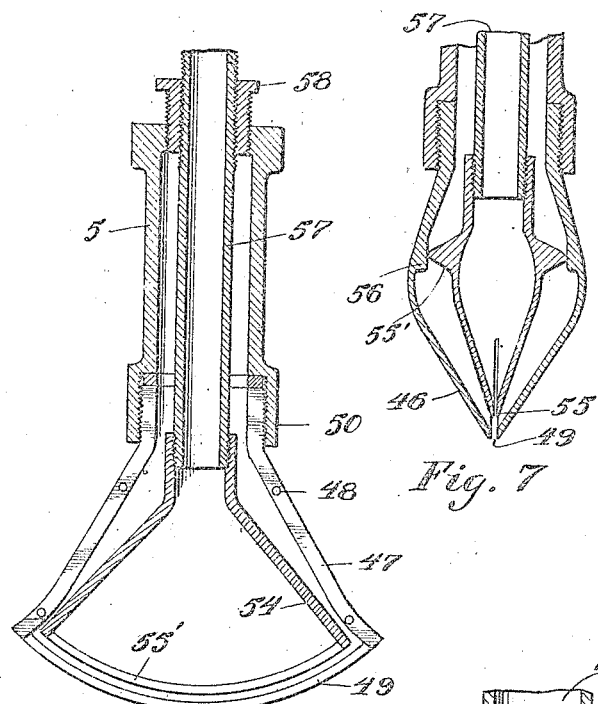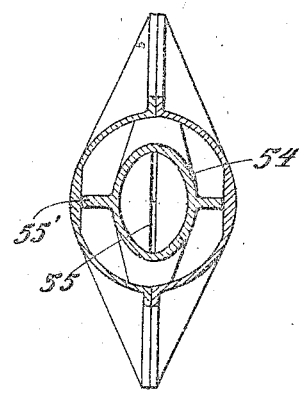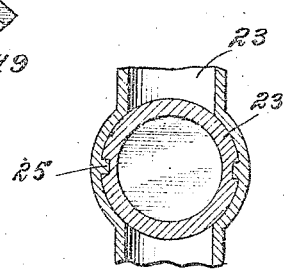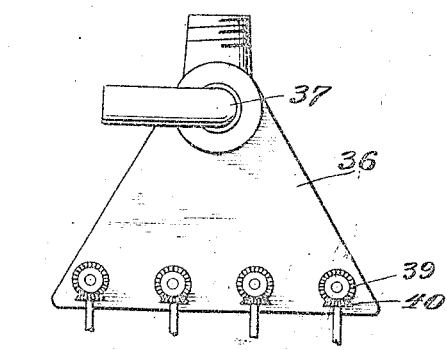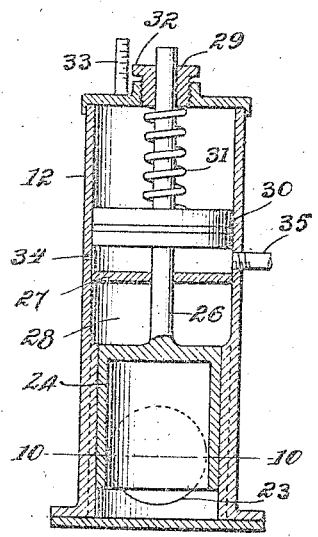

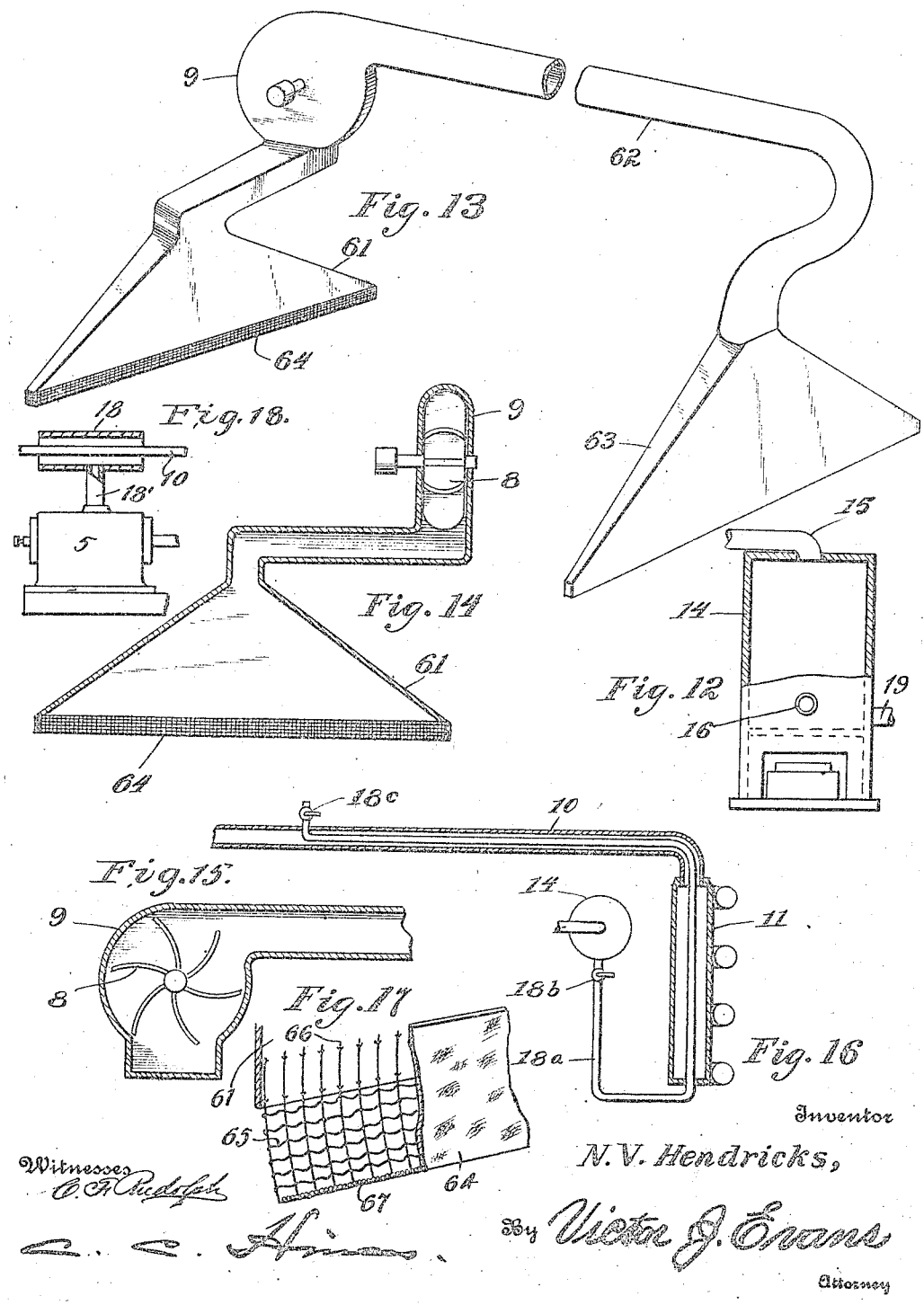

UNITED STATES PATENT OFFICE.

NATHAN V. HENDRICKS, OF MERIDIAN, MISSISSIPPI, ASSIGNOR TO UNIFORM ASPHALT DISTRIBUTOR COMPANY, OF MERIDIAN, MISSISSIPPI, A CORPORATION OF MISSISSIPPI.

OIL-DISTRIBUTING APPARATUS.

1,210,069.  Specification of Letters Patent.  Patented Dec. 26, 1916.

Application filed November 17, 1914. Serial No. 872,609.

*To all whom it may concern:*

Be it known that I, NATHAN V. HENDRICKS, a citizen of the United States, residing at Meridian, in the county of Lauderdale and State of Mississippi, have invented new and useful Improvements in Oil-Distributing Apparatus, of which the following is a specification.

This invention relates to an oil distributing apparatus designed particularly for use in surface coating roads and streets with dust-laying oils or tar products of the kinds commonly employed.

One object of the invention is to provide an oil distributing apparatus by means of which oil or tar of any specific gravity or density may be distributed, and heavy grade oils distributed with greater efficiency than is possible with distributers of ordinary construction.

A further object of the invention is to provide an oil distributing apparatus wherein provision is made for distributing the oil or tar under air pressure in a regular and even manner according to the character of the road and to the speed of travel of the apparatus.

A still further object of the invention is to provide an oil distributing apparatus wherein provision is made for heating the air so as to maintain the oil or tar at the desired degree of fluidity so as to insure its proper and even distribution and obviate any liability of the oil or tar clogging the apparatus at any time.

A further object of the invention is to provide an oil distributing apparatus embodying a means for supplying the air at proper periods and pressure, to provide novel oil and air nozzles for spreading the oil and which are relatively adjustable to govern the spreading action, and to provide means whereby the feed of the oil and the air may be manually as well as automatically controlled.

A still further object of the invention is to provide novel means for removing the dust from the road and depositing it upon the oiled surface, thereby insuring the direct deposit of the oil and its cohesion to the surface, the laying or retention of all the particles of dust, as well as the retention of the oil so that it will uniformly coat the road or street surface.

A still further object of the invention is to provide other improved features of construction, and to generally simplify and improve the construction and increase the efficiency of apparatus of this character, as hereinafter fully described and claimed.

The invention consists of the features of construction, combination and arrangement of parts herein fully described and claimed, reference being had to the accompanying drawings in which:—

Figure 2:
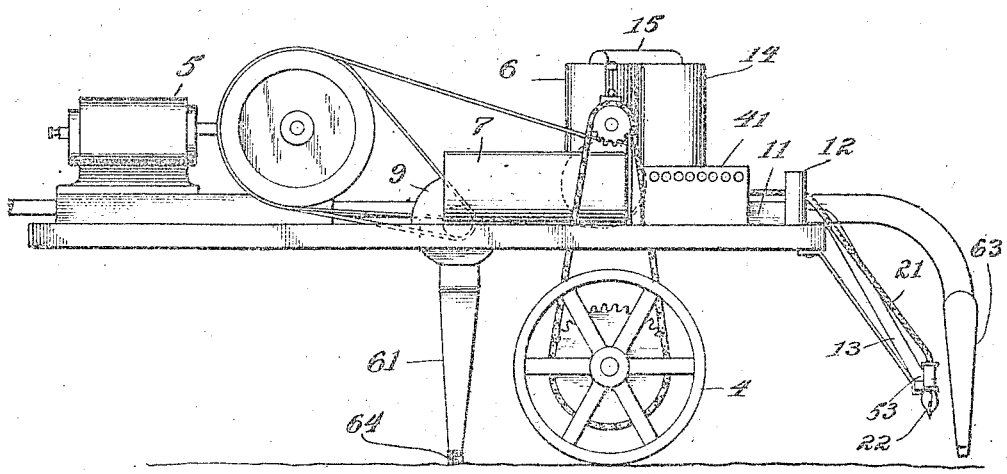

Figure 1 is a rear elevation of an oil distributing apparatus embodying my invention. Fig. 2 is a side elevation of the same. Fig. 3 is a top plan view of the apparatus. Fig. 4 is a side elevation of one of the distributing nozzles. Fig. 5 is an end elevation or edge view of the same. Fig. 6 is a vertical transverse section through the nozzle on the plane indicated by the line 6—6 of Fig. 5. Fig. 7 is a vertical front to rear section taken on the plane indicated by the line 7—7 of Fig. 4. Fig. 8 is a horizontal transverse section on the line 8—8 of Fig. 5. Fig. 9 is a sectional elevation of one of the feed controlling valves. Fig. 10 is a detail section thereof on line 10—10 of Fig. 9. Fig. 11 is a detail view of one of the cut-off valves and distributing pipes connected therewith. Fig. 12 is an enlarged detail view, partly in section, of the air heater. Fig. 13 is a perspective view of the dust removing and depositing device. Fig. 14 is a vertical transverse section through the suction fan casing and discharge nozzle thereof. Fig. 15 is a vertical longitudinal section of the same. Fig. 16 is a sectional plan view of the oil manifold and oil supply pipe, showing a modified form of heating means. Fig. 17 is a detail view showing more particularly the construction of the flexible rim of the suction nozzle. Fig. 18 is a detail view showing a modification.

The apparatus comprises a suitable wheeled truck or vehicle, which includes a platform 2, axles 3 and supporting wheels 4, which latter are mounted upon said axles and are designed to travel upon the street or road surface to be operated upon. If desired the apparatus may be provided with its own motive power, in which event the oil or tar reservoir or supply tank will be mounted thereon, or the apparatus may be suitably hitched to and drawn behind a tank wagon having a desired oil or tar containing storage capacity. It may be assumed, for purposes of exemplification, that the present type of apparatus is designed for use in connection with a tank storage wagon, and it will be understood that in practice suitable draft attachments or coupling means may be provided for this purpose.

Mounted upon the platform 2 is an engine or motor 5, of the gasolene or other suitable type, and which drives an air pump or compressor 6 with which communicates, through a suitably valved connection, an air storage tank or receiver 7. The motor also drives a suction fan 8 arranged in a casing 9, through suitable gearing between the engine and fan shafts.

Supported upon the platform is a supply pipe 10, which is designed for coupling connection at its forward end with a storage supply tank upon a tank wagon to which the distributer is coupled, as hereinbefore explained. The oil or tar flows through this pipe 10 from the source of supply to the distributing mechanism by gravity, or under air pressure, as desired. This distributing mechanism comprises a header or chamber 11 with which the rear end of the pipe 10 connects, said chamber being provided with outlets governed by a series of feed controlling valves 12 with which communicate oil distributing tubes or pipes 13, which valves are of the construction hereinafter described.

Arranged in the connection between the compressor 6 and the receiver 7 is a heating device 14 of any suitable construction, whereby the air passing to the receiver may be heated, said heater being arranged between pipes 15 and 16 leading respectively from the compressor to the heater and from the latter to the receiver, and each having a check valve or other suitable controlling valve 17 therein, by which the flow of air to the heater and receiver may be controlled. The oil supply pipe 10 is also inclosed by a heater 18 comprising a cylindrical casing forming a jacket which is heated by lamps or other heating devices 19, by which the oil or tar on its flow may be kept properly heated and liquefied so as to prevent it from choking the pipes or feeding slowly to the distributing devices.

The heater 14, which also forms an air reservoir, is provided with an outlet 19' controlled by a cut-off valve 20 and having branch pipes or tubes 21, equal in number to the distributing devices, connected therewith, one of the tubes or pipes 13 and one of the tubes or pipes 21 extending to a distributing device 22, the oil and air distributing pipes or tubes thus being arranged in coöperating pairs, as shown.

The pipes 13 communicate with the valve devices 12, each of which comprises a casing having a discharge passage 23 controlled by a sliding valve or gate 24 movable in guideways 25 and connected with a stem 26. The passage 23 is formed in the lower portion of the valve casing, which is separated from the upper portion of said chamber, by a partition 27 forming a pressure chamber 28. The valve stem 26 works through the partition 27 and extends upwardly and outwardly at the top of the casing through an adjusting tube or sleeve 29 having a threaded connection with the casing and also serving as a guide for the upper end of the valve stem. Between this adjusting device 29 and a piston head or diaphragm 30 connected with the valve stem is a coiled pressure regulating spring 31 which normally acts to hold the valve in closed position against a predetermined air pressure, but is adapted to be overcome by an increased air pressure whereby the valve will be opened for the discharge of oil. The tension of this spring may be regulated to set the valve to operate at any determined pressure by adjustment of the sleeve 29, which has a gripping flange 32 acting also as an indicator in conjunction with a scale 33, by means of which the tension or working pressure of the valve may be ascertained at any time. The chamber 28 is provided with an opening 34 by which air may exhaust from the pressure chamber below the piston to the atmosphere to effect the quick closing of the valve.

The pressure chambers of the feed controlling valves connect with air feed pipes or tubes 35 communicating with a manifold 36, connected with the receiver or reservoir 7 through a cut-off valve 37, whereby all of the air supply pipes, four in number in the present instance, may be thrown into and out of communication with the receiver and automatic feed controlling valves 12. The valves 20 and 37 may be similar in construction, and each of the pipes 21 and 35 is provided with an independent valve 38 the stem of which is provided with a gear 39 meshing with a gear 40 on the shaft of a controlling device 41, by means of which the supply of air to each of the valves 12, as well as to each of the distributers 22, may be manually controlled to regulate the individual feed as occasion may require under different circumstances.

In the connection between the receiver 7 and valve 37 is a valve for automatically controlling the feed of air from the receiver 7 to the manifold 36, which valve 42 is controlled by a governor 43 in gear with a shaft 44 receiving motion through chain and sprocket gearing from one of the axles 3 when the apparatus is in motion, so that the volume and pressure of the air supply will be governed by the rate of speed of travel of the apparatus over the road or surface, to vary the supply of oil as such conditions require. This is an important part of the invention, as it is essential to a proper covering of the road surface with oil or tar that a certain amount of oil or tar must be distributed per square yard of the road surface, which can only be effected by the use of automatic means governed by the rate of travel or speed of the apparatus to supply the oil or tar in proper volume to the road surface.

Each distributer 22 is of novel construction and comprises a substantially hatchet-blade shaped oil discharge nozzle 46, composed of counterpart sections 47 united at their marginal side edges by bolts or rivets or equivalent fastening means 48, and having the lower arcuately curved rim edges thereof formed to provide one or more slots or apertures 49 through which the oil or tar is spread on to the road or street surface. This nozzle is connected by a coupling member or collar 50 with the lower branch of a vertically disposed T-connection 51, the lateral or horizontal branch 52 of which is connected by a coupling 53 with the co-acting oil feed pipe 13, whereby the oil is supplied to the nozzle. Arranged within the nozzle 46 is an air discharge nozzle 54, which is shaped to conform thereto, but is spaced at all sides therefrom to provide an intervening channel for the flow of the oil to be spread. This air discharge nozzle is of a construction corresponding to the oil discharge nozzle and is formed with a discharge outlet 55 arranged in proximity to the outlet or outlets 49, so that the blast of air issuing from the air discharge nozzle will jet or spread the oil or tar with the desired force and fineness against the surface to be coated.

The air discharge nozzle is provided with lugs or projections 55' which engage guide members 56 within the oil discharge nozzle and hold said air discharge nozzle centered within and with respect to the oil discharge nozzle, and also provide for the proper guidance of said air discharge nozzle in its adjustments so that its discharge end 55 may be disposed closer to or farther from the discharge end 49 of the oil discharge nozzle for a regulation of the action of the blast and discharge of the oil or tar to a nicety of degree to secure an even distribution of the fluid. The inlet end of the nozzle 54 communicates with a conducting tube 57 which is in threaded engagement with an adjusting collar or sleeve 58 having a threaded engagement with the upper branch 59 of the T-connection 51, so that the air discharge nozzle may be adjusted as described, the upper end of the tube 57 being connected with the coöperating feed pipe or tube 21. It will thus be seen that when the apparatus is in operation the main controlling valve 42 will be opened to a greater or less degree through the action of the governor according to the travel of the apparatus, and will therefore supply air to the pressure chambers of the valves 12 to open said valves for the feed of regulated quantities of oil or tar to the discharge nozzles, the air thence discharging through the outlets 34 and keeping the valve casing thoroughly heated to maintain the oil or tar in a freely liquid condition so that it will not clog or interfere with the movements of the valve.

When the motion of the apparatus stops, the governor will automatically close the main valve 42, which will result in the automatic closure of the valves 12 through the action of their closing springs 31, thus insuring the positive cut-off of the feed of oil, similarly the main valve 42 and valve members 24 will be opened to varying degrees according to the speed of travel of the apparatus to proportionately regulate the feed of oil or tar to the discharge nozzles, so as to insure a perfect distribution of the fluid and coating of the road or street surface, while at the same time preventing waste of the material. By also combining with the oil or tar at the points of discharge heated air in the form of a blast through the air discharge nozzles, the nozzles will be prevented from clogging or choking and the fluid kept in a properly heated condition for atomization to the degree necessary to insure a perfect spread. This system of distribution, wherein the oil or tar is discharged in the manner described, provides for the efficient use of heavy viscous grades of oil and tar in a most efficient manner, since the oil or tar may be kept in an absolutely fluid condition at all times, with manifest advantages. Chilling of the oil or tar may thus be prevented while the distributing mechanism is being connected with a new storage supply tank, after the one in use has become exhausted, during which period the flow of the oil is arrested in the distributing mechanism and the oil is liable to become viscous and clog up the valves and pipes.

It will, of course, be understood that any suitable or desired number of distributers or discharge nozzles may be employed and that these may be supported with the feed tubes or pipes upon the vehicle so as to be adjustable with relation to the surface of the ground. It will also be understood that under some conditions, as with the use of light oils, the heating elements need not be used or may be dispensed with. It will be apparent that as, with the described structure, the feed of the oil to the nozzle is not only automatically controlled according to the speed of the apparatus, but that the supply of air and oil to the individual nozzles may be individually governed, the nozzles may be controlled to distribute the same or variable amounts of oil according to the condition of the road or surface to be treated. On well traveled roads or highways, the greatest wear occurs mainly in the center of the road, where it first needs repairs, or where it first wears out.

With the present construction, the valves may be adjusted at any time without stopping the machine to distribute a greater or less amount to any one or more of the nozzles, so that the supply of oil to the road surface may be graduated from light to heavy or heavy to light and applied in proper volume as the particular needs of the road require. The outer or oil discharge nozzle, at least, of each nozzle device is composed of sections to admit of the ready application and removal of the air nozzle, as well as to provide for the ready cleaning or repairs of the nozzles when necessary. By the use of a main cut-off valve in conjunction with individual valves in the air and oil feed pipes, the feed of the oil as well as of the air may be controlled to an exact degree without stopping the apparatus, the advantages of which will be evident.

In applying the oil to the surface of a roadway it is very important, in order to secure the proper cohesion, that all particles of dust be removed. A direct blast of air on the road surface has the disadvantage of a great portion of the dust settling back on to the road before the oil strikes it, and also when this dust is raised in the open much of it is blown into the spray of oil and the atoms of oil are to a greater or less extent coated with it and their adhesive qualities thus impaired. In order to overcome this objection I provide means for removing the dust from the road surface by a suction, allowing the distributing nozzles to spread the oil on to the hard road surface, after which the taken up dust is deposited in the form of a film or layer over the oil. As shown, the casing 8 of the suction fan 9 communicates with a suction nozzle 61, arranged to move over the surface of the road, for the purpose of drawing up all free particles of dust. This nozzle is disposed in advance of the oil distributers and thus acts to clean and leave the road substantially free from dust so that the oil will be distributed upon the body or hard surface of the road. This dust will be forced by the action of the fan rearwardly through to pipe 62 and deposited through a nozzle 63 on to the oiled surface of the ground. By this means perfect adhesion between the road and oil or tar is secured, while the deposited layer of dust acts to hold the oil against draining off from the high portion or crest of the road, an even coating of the road being thereby insured. The nozzle 61 comprises a box having its mouth portion provided with a surrounding marginal flexible rim 64, composed of a suitable fabric, reinforced by crimped wire springs 65 carried by spring tines or fingers 66 resiliently held in a determined relation by coiled springs 67. The fabric and coiled springs are vertically movable on the spring tines or fingers, while the latter are adapted to independently bend or flex under pressure from contact with the road surface, thus allowing the rim or mouth of the nozzle to conform to the contour of the road surface as well as to conform to depressions and irregularities therein, obtaining an efficient suction action for the taking up of the dust.

Under some conditions I may dispense with the heater 18 and substitute in lieu thereof a tube or pipe 18$^a$ leading from the air heater 14 to and through the header or chamber 11, and thence through the pipe 10, and extending outward through said pipe, so that the heated air from the heater 14 may pass through the oil feed connections described and finally discharge into the atmosphere. Suitable valves 18$^b$ and 18$^c$ are provided in this pipe 18$^a$ for the purpose of controlling the flow of the heated air. By the use of this construction of heater the oil may be heated to such a degree as will prevent it from becoming stiff when the machine is standing for any length of time or the oil becomes chilled and heavy in its flow. When the oil is moving with sufficient freedom, this heating device may be cut out of operation, and may be dispensed with entirely in the use of light oils. In some cases, if desired, the exhaust from the engine may be conducted through a pipe 18' into the cylindrical casing 18, as shown in Fig. 18, and the latter may be made to surround the pipe 10 throughout its entire length, so that a heating jacket of high efficiency will be produced.

I claim:

1. In a machine for distributing oil to road surfaces, the combination of a traveling vehicle, oil distributing nozzles, oil-conductors leading thereto, compressed air conductors leading to the nozzles, fluid pressure actuated valves governing the supply of oil through said oil conductors, compressed air conductors leading to said valves, and an independent valve mechanism governed automatically by the speed of the vehicle for regulating the supply of air through said compressed air conductors leading to said valves.

2. In a machine for distributing oil to road surfaces, the combination of a traveling vehicle, oil distributing nozzles, oil conductors leading thereto, compressed air conductors leading to the nozzles, fluid pressure operated valves controlling the flow of oil through said oil conductors, compressed air conductors leading to the valves, a valve mechanism governing the flow of air through said compressed air conductors leading to said fluid pressure operated valves, and an automatic governor for actuating said valve mechanism.

3. In a machine for distributing oil to road surfaces, the combination of a traveling vehicle, oil distributing nozzles, an air blast nozzle within each distributing nozzle, means for supplying heated air to the air blast nozzles, oil conductors leading to the oil distributing nozzles, fluid pressure valves controlling the supply of oil to said conductors, and means governed by the speed of the vehicle, for controlling the supply of fluid pressure to said fluid pressure valves.

4. In a machine for distributing oil to road surfaces, the combination of a traveling vehicle, oil distributing nozzles, oil conductors leading to said nozzles, air blast nozzles within the distributing nozzles, compressed air supply pipes leading to the air blast nozzles, fluid pressure controlled valves governing the flow of oil to the oil conductors, air conductors for conveying compressed air to the valves whereby to operate them, and means controlled by the running speed of the vehicle for regulating the supply of air to the valves through said conductors.

5. In a machine for distributing oil to road surfaces, an oil distributing nozzle, an air blast nozzle within said distributing nozzle, an oil conductor leading to the distributing nozzle, a fluid pressure controlled valve governing the supply of oil from said conductor to the nozzle, and automatic means governed by the speed of the vehicle for controlling the supply of pressure fluid to said valve.

6. In a machine for distributing oil to road surfaces, the combination of a traveling vehicle, oil distributing nozzles, an air blast nozzle within each distributing nozzle, means for supplying air to the air blast nozzles, oil conductors leading to the oil distributing nozzles, fluid-pressure controlled valves controlling the supply of oil to said conductors, and automatic means governed by the speed of the vehicle for supplying air in regulated quantity and pressure for controlling said valves.

7. In a machine for distributing oil to road surfaces, the combination of a traveling vehicle, oil distributing nozzles, an air blast nozzle within each distributing nozzle, means for supplying air to the air blast nozzles, oil conductors leading to the oil distributing nozzles, fluid pressure controlled valves controlling the supply of oil to said conductors, and means governed by the speed of the vehicle for controlling the supply of pressure fluid to said fluid pressure valves.

8. In a machine for distributing oil to road surfaces, the combination of a traveling vehicle, oil distributing nozzles, an air blast nozzle within each distributing nozzle, means for supplying air to the blast nozzles, oil conductors leading to the oil distributing nozzles, fluid pressure valves controlling the supply of oil to said conductors, means governed by the speed of the vehicle for controlling the supply of pressure fluid to said fluid pressure valves, and manually operable valves for independently governing the supply of oil and air to said nozzles and valves respectively.

9. In a machine for distributing oil to road surfaces, the combination of a traveling vehicle, oil distributing nozzles, oil conductors leading thereto, means for supplying heated air to said nozzles, fluid pressure operated valves controlling the flow of oil through said conductors, and means controlled by the speed of the vehicle for supplying air to the valves in regulated quantity and pressure.

10. In a machine for distributing oil to road surfaces, the combination of a traveling vehicle, oil distributing nozzles, oil conductors leading thereto, and fluid pressure operated valves controlling the flow of oil through said conductors, and means controlled by the speed of the vehicle for supplying air to the valves in regulated quantity and pressure.

11. In a machine for supplying oil to road surfaces, the combination of a traveling vehicle, oil distributing nozzles, air feed nozzles disposed within the oil feed nozzles, means for supplying heated air thereto, valves for controlling the supply of oil to the distributing nozzles, and fluid pressure means for supplying fluid pressure to operate the valves, said means being controlled by the speed of the vehicle to regulate the supply of fluid to the valves.

12. In a machine for supplying oil to road surfaces, the combination of a traveling vehicle, oil distributing nozzles, air blast nozzles disposed within the oil feed nozzles, valves for controlling the supply of oil to the distributing nozzles, and fluid pressure means for supplying fluid pressure to operate the valves, said means being controlled by the speed of the vehicle to regulate the supply of fluid to the valves.

13. In a machine for distributing oil to road surfaces, the combination of a traveling vehicle, oil distributing nozzles, conductors for supplying oil thereto, fluid pressure operated valves governing the flow of oil through said conductors, said valves being adjustable to regulate the working action thereof, a source of air supply, a valve controlling the flow of air therefrom to the first-named valves, and a governing means controlled by the speed of the vehicle for controlling said valve.

In testimony whereof I affix my signature in presence of two witnesses.

NATHAN V. HENDRICKS.

Witnesses:
    Geo. F. Hand,
    E. Dial.